Figure 4:
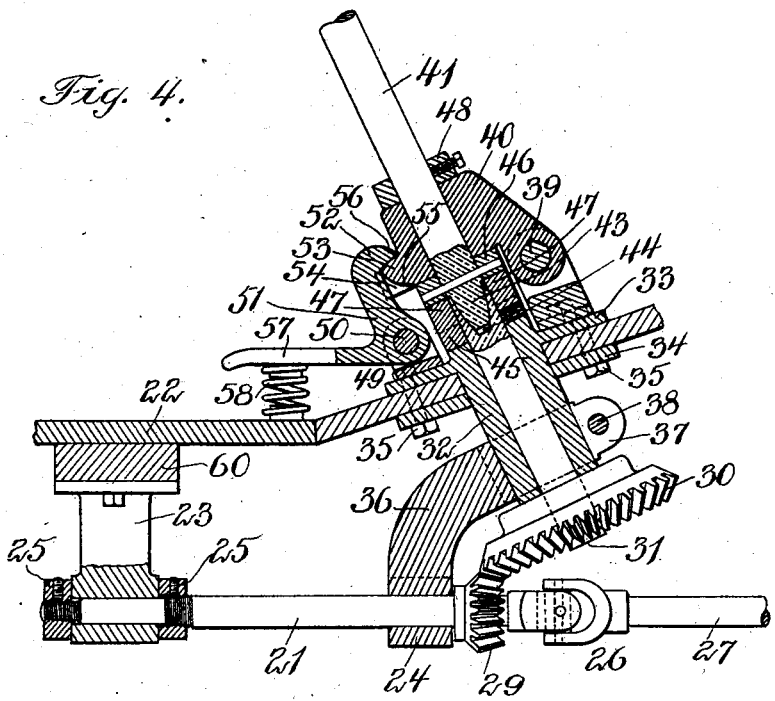

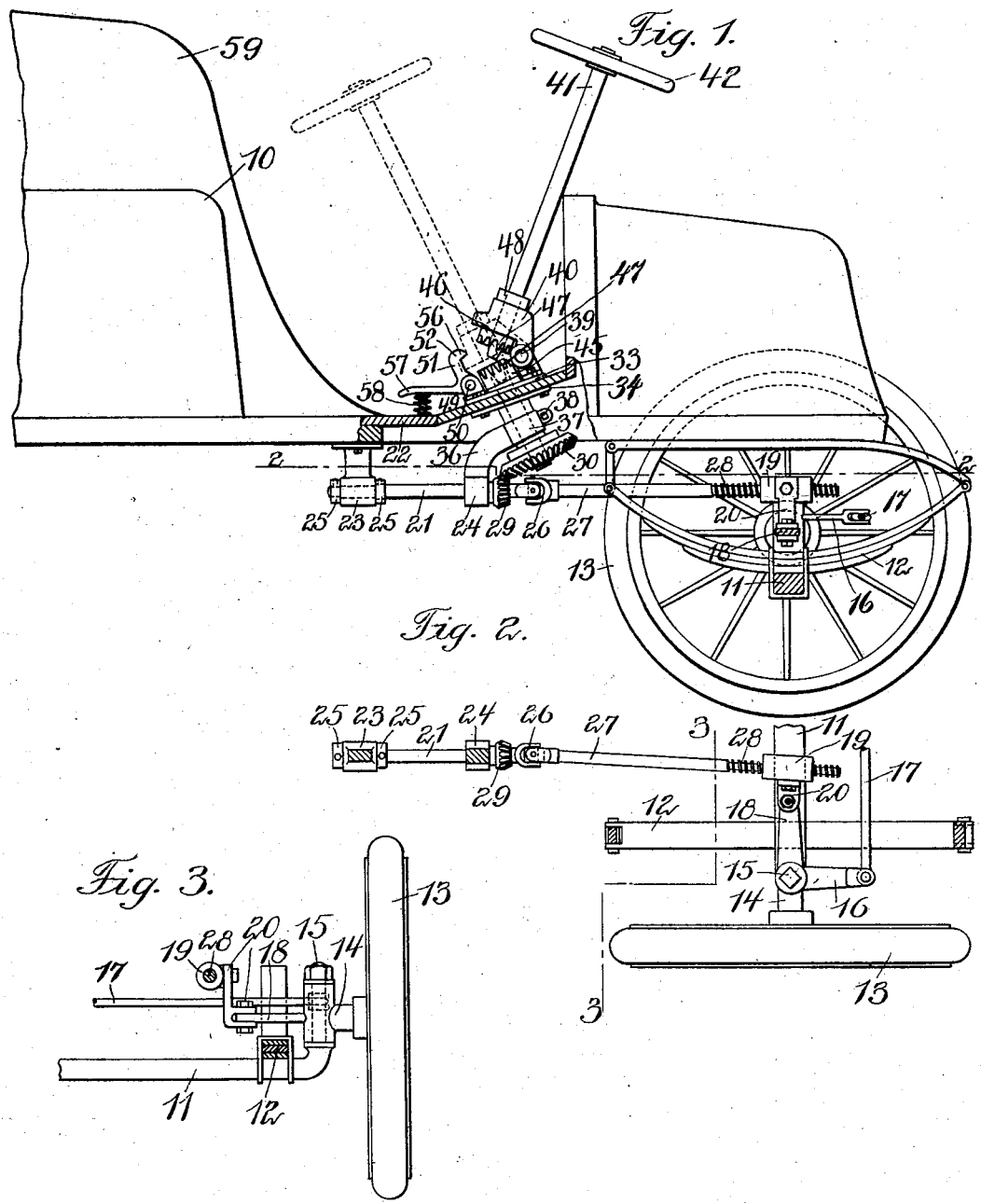

No. 729,538. PATENTED JUNE 2, 1903.
H. H. BUFFUM.
AUTOMOBILE STEERING APPARATUS.
APPLICATION FILED JAN. 2, 1903.
NO MODEL. 2 SHEETS—SHEET 2.

Witnesses:
H. L. Robbins
Adeline C. Ratigan

Inventor:
H. H. Buffum

No. 729,538. Patented June 2, 1903.

UNITED STATES PATENT OFFICE.

HERBERT H. BUFFUM, OF ABINGTON, MASSACHUSETTS.

AUTOMOBILE STEERING APPARATUS.

SPECIFICATION forming part of Letters Patent No. 729,538, dated June 2, 1903.

Application filed January 2, 1903. Serial No. 137,421. (No model.)

*To all whom it may concern:*

Be it known that I, HERBERT H. BUFFUM, of Abington, in the county of Plymouth and State of Massachusetts, have invented certain new and useful Improvements in Automobile Steering Apparatus, of which the following is a specification.

This invention relates to the steering mechanism of motor-vehicles; and its objects are to provide an improved distribution of strains and wear, so as to avoid looseness and backlash in the working parts, and also to permit the steering-pillar to be thrown forward from the steersman's seat in order to enable him to enter and leave said seat easily. In the preferred construction for accomplishing these objects I employ lower steering connections comprising a nut on the knuckle or journal of the guiding ground-wheel, a horizontal longitudinal shaft mounted in stationary bearings on the vehicle-body, and a rotary screw engaged with said nut and having a universal connection with the said shaft to allow for the relative movements of the body and wheels due to the springs. This horizontal shaft connects, through a pair of bevel-gears, with a short inclined shaft mounted in fixed bearings in the vehicle-floor, and above said floor is a pivoted bearing, which carries the steering-pillar and permits the latter to swing toward and from the steersman into and out of alinement with the short inclined shaft. Such swinging movement also throws into and out of engagement the members of a toothed coupling carried, respectively, by the pillar and short shaft, which members when the shaft and pillar are in alinement properly connect the latter and transmit the movements of the pillar to the shaft, whereby the aforesaid screw is caused to rotate in its nut and turn the steering wheel or wheels. A foot-operated lever-catch holds the steering-pillar in its normal steering position. This arrangement has the advantage that the pillar can be quickly thrown forward when the steersman desires to enter or leave his seat and is then entirely out of the way, and, furthermore, this operation can be performed without moving the steering-wheels, no matter what the position of the latter. A further advantage of the mechanism is that the horizontal longitudinal shaft before mentioned has a thrust-bearing, which takes all the thrust transmitted from the ground-wheels and removes it from the parts immediately connected with the steering-pillar, thereby greatly increasing the life and proper working of such parts by reducing wear and strain thereon.

Figure 5:
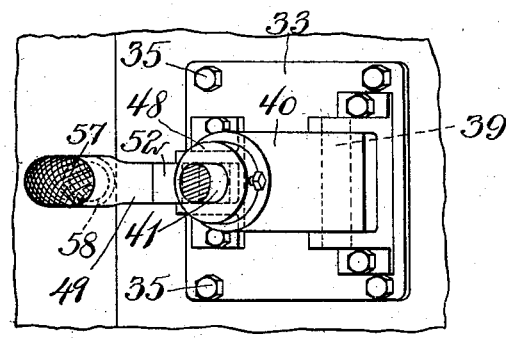
Figure 6:
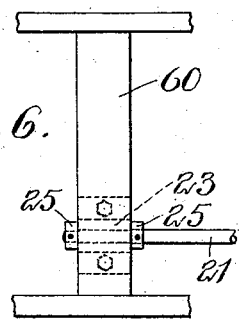

Of the accompanying drawings, Figure 1 represents a side elevation, partly in section, showing a vehicle provided with a steering mechanism constructed in accordance with my invention. Fig. 2 represents a section on line 2 2 of Fig. 1. Fig. 3 represents a section on line 3 3 of Fig. 2. Fig. 4 represents an enlarged vertical section of the main portion of the steering mechanism. Fig. 5 represents a plan view thereof. Fig. 6 represents a horizontal section just below the vehicle-floor, showing the attachment of the thrust-bearing to one of the cross-sills of the frame.

The same reference characters indicate the same parts in all the figures.

In the drawings, 10 is the vehicle-body, 11 is the dead front axle supporting the body yieldingly through the springs 12, and 13 13 are the guiding ground-wheels or steering-wheels mounted upon the short axles or journals 14, commonly called "knuckles," said knuckles being pivoted at 15 to the dead-axle 11. The usual arm 16 and link 17 connect the wheels, and an arm 18 is shown as extending inwardly from the knuckle 14. On the inner end of this arm a nut 19 is mounted by a universal joint or connection 20.

21 is a horizontal shaft extending longitudinally underneath the floor 22 of the vehicle-body and mounted in fixed bearings 23 24, the bearing 23 being flanked by adjustable collars 25 25 on the shaft 21, which receive the end thrust of said shaft and are adapted to be adjusted to take up wear. At its front end the shaft 21 connects by a universal joint or connection 26 with a rotary rod 27, formed with a screw-thread 28 on its forward end which engages the complemental screw-thread of nut 19, it being evident that when shaft 21 is rotated it rotates rod 27 and causes nut 19 to move along the thread 28, thereby swinging the steering-knuckles 14 and wheels 13. The universal joints 26 and 20 allow the rod 27 to change its angle according to the angle of the steering-knuckle and the varying distance of the dead-axle 11 from the body 10.

On the shaft 21 is a bevel-pinion 29, meshing with a bevel-gear 30, attached to the lower end of a backwardly-inclined short shaft 31, which is mounted in an inclined bearing 32, attached to the vehicle-floor 22 by plates 33 34 and bolts 35 35. The bearing 24 is shown as formed on a bracket 36, attached by a collar 37 and nut 38 to the lower part of bearing 32, whereby bracket 36 may be adjusted longitudinally of said bearing and wear of the gears 29 30 taken up. Pivoted at 39 to the plate 33 is a bearing 40, supporting the steersman's pillar 41, having a hand-wheel or handle 42 at its upper end. The pillar has a conical or tapered projection 43 fitting in a complemental tapered socket 44 to insure a proper alinement of the pillar 41 and short shaft 31 when the pillar is in the steering position. Fixed to the shaft 31 and pillar 41, respectively, are complemental coupling members 45 46, formed with interengaging tapered teeth 47 47, which coupling members fit into each other and form a secure coupling between the shaft and pillar when the two are alined, whereby the rotative movements of the pillar are transmitted to the shaft. Above the bearing 40 is a collar 48, fixed on the pillar 41, which together with the coupling member 46 prevents longitudinal movement of the pillar in said bearing.

49 is a foot-lever pivoted at 50 to the plate 33 and having an arm 51, formed with a head 52, adapted to take over a lug 53 when the shaft and pillar are alined, as shown in Fig. 4, whereby the bearing 40 is locked in its normal position, holding the pillar 41 and shaft 31 in alinement and the coupling members 45 46 in full connection. The bearing 40 also has lugs 54, between which the neck of the arm 51 resides when the catch is engaged, and the lug 53 and head 52 are respectively beveled or rounded at 55 56 to enable the catch to snap into place when the pillar is brought into steering position. The lever 49 has an arm 57, elevated by a spring 58, which normally throws the catch into engaging position, said arm being depressed by the operator's foot when he wishes to release the steering-pillar.

It is evident that the pillar 41 may at any time be released by the operator's foot depressing the lever 49 and the steering-pillar thrown forward away from the vehicle-seat 59 to the position shown in Fig. 1, thereby leaving the space in front of said seat free. The coupling members 45 46 separate to permit such movement, and when the pillar is brought back into steering position these members engage again and the pillar is automatically locked by the catch-lever 49.

It will be seen that the shaft 21 has a support and thrust-bearing apart from the support and bearing of the steering-pillar 41 and shaft 31. The steering-pillar and its appurtenant parts are supported on the floor 22, as is the practice in many vehicles; but in prior art steering mechanism thus supported it has been usual to allow the floor to take the thrust and strain from the steering-wheels, the result being in practice that this floor will become loose unless it is very strongly braced and constructed, which is not usually the case and which, moreover, involves an expensive body construction. In the case of this invention the shaft 21 may have its thrust-bearing on any convenient part of the body which is sufficiently rigid to withstand the thrust. In the present instance I show the bearing 23 as supported upon a cross-sill 60 of the body-frame, and thus it will be seen that the floor 22 is entirely relieved from the strain caused by the end thrust of the steering connections. I regard this feature as one of the important and valuable characteristics of my invention.

I claim—

1. In a vehicle steering mechanism, a fixed base, a shaft stationarily journaled thereon, steering devices operated by said shaft, a steersman's pillar, a bearing therefor pivoted to said base, and a coupling connecting said shaft and pillar and having provisions for permitting a swinging movement of said pillar and bearing.

2. In a vehicle steering mechanism, a stationarily-journaled shaft, steering devices operated thereby, a swinging bearing, a steersman's pillar mounted in said bearing, and a separable coupling connecting said shaft and pillar.

3. In a vehicle steering mechanism, a fixed base, a short shaft journaled thereon, steering devices operated by said shaft, an operator's steering pillar and handle, and provisions for connecting and disconnecting said pillar and shaft close to the base.

4. In a vehicle steering mechanism, a stationarily-journaled shaft, steering devices operated thereby, a swinging steersman's pillar, and a separable coupling connecting said shaft and pillar and comprising complemental or mating crown-tooth coupling members attached respectively to said shaft and pillar.

5. In a vehicle steering mechanism, a fixed base, a short shaft journaled thereon, steering devices operated by said shaft, an operator's steering pillar and handle, provisions for connecting and disconnecting said pillar and shaft close to the base, and a foot-operated catch for holding said pillar and shaft in connection.

6. In a vehicle steering mechanism, a stationarily-journaled shaft, steering devices operated thereby, a steersman's pillar movable into and out of line therewith, and a foot-operated catch for holding said pillar and shaft in line.

7. In a vehicle steering mechanism, a stationarily-journaled shaft, steering devices operated thereby, a swinging bearing, a steersman's pillar mounted in said bearing, a separable coupling connecting said shaft and pillar, and means for locking the members of said coupling against separation.

8. In a vehicle steering mechanism, a stationarily-journaled shaft, steering devices operated thereby, a swinging bearing, a steersman's pillar mounted in said bearing, a separable coupling connecting said shaft and pillar, and an automatically-engaging catch coacting with said bearing for holding the members of said coupling against separation.

9. In a vehicle steering mechanism, a guiding ground-wheel, a pivoted arm connected to swing said wheel, a nut pivoted to said arm, a swinging screw-rod having a threaded portion occupying said nut and a pivotal end, means connected with the pivotal end of said rod for resisting the end thrust transmitted through the rod from the ground-wheel, and steersman-operated means for rotating said rod.

10. In a vehicle steering mechanism, a vehicle-body, a guiding ground-wheel yieldingly connected with said body, a pivotal arm connected to swing said wheel, a nut having a universal connection with said arm, a shaft having an end thrust bearing on the body, a screw-rod engaged with said nut and having a universal connection with said shaft, and steersman-operated means for rotating said shaft.

11. In a vehicle steering mechanism, a vehicle-body, steersman-operated mechanism thereon, a guiding ground-wheel having a swinging journal yieldingly connected with said body, a nut having a universal connection with said journal, and a rotary screw-rod engaged with said nut and having a universal connection with said mechanism.

12. In a vehicle steering mechanism, a vehicle-body having a floor, a steering-pillar supported by said floor, and steering connections operated by said pillar and having an end thrust bearing on the body apart from the support of said pillar.

13. In a vehicle steering mechanism, a vehicle-body having a framing and a floor, a steering-pillar supported by said floor, a rotary shaft geared with said pillar and having an end thrust bearing on said framing, and steering devices connected with said shaft.

14. In a vehicle steering mechanism, a swinging ground-wheel, a swinging rotary steersman's pillar, and steering connections between said pillar and wheel including a coupling connected and disconnected by swinging movement of said pillar.

15. In a vehicle steering mechanism, a swinging ground-wheel, a swinging rotary steersman's pillar, steering mechanism stationarily mounted on the vehicle and connected with said wheel, and a coupling having complemental toothed members attached to said pillar and mechanism respectively and thrown into and out of mesh by swinging movement of said pillar.

16. In a vehicle steering mechanism, a swinging ground-wheel, a swinging rotary steersman's pillar, steering connections between said pillar and wheel including a coupling connected and disconnected by swinging movement of said pillar, and means to lock the pillar in its coupling-connecting position.

In testimony whereof I have affixed my signature in presence of two witnesses.

HERBERT H. BUFFUM.

Witnesses:
R. M. PIERSON,
C. F. BROWN.